United States Patent [19]
Mikkelsen et al.

[11] Patent Number: 5,467,446
[45] Date of Patent: Nov. 14, 1995

[54] SYSTEM AND METHOD FOR RASTERIZING IMAGES SUBJECT TO ORTHOGONAL ROTATION

[75] Inventors: Carl M. Mikkelsen, Sudbury; Edward S. Gavrin, Weston, both of Mass.

[73] Assignee: ColorAge, Inc., Billerica, Mass.

[21] Appl. No.: 10,819

[22] Filed: Jan. 29, 1993

[51] Int. Cl.⁶ .................................................. G06T 3/00
[52] U.S. Cl. .................. 395/143; 395/133; 395/137; 395/138
[58] Field of Search ................ 395/118, 133–142, 395/143, 155, 161, 162, 275, 375; 364/DIG. 1, DIG. 2; 382/42, 44

[56] References Cited

U.S. PATENT DOCUMENTS

| | | | |
|---|---|---|---|
| 4,052,699 | 10/1977 | Micka et al. | |
| 4,472,732 | 9/1984 | Bennett et al. | 358/22 |
| 4,716,564 | 12/1987 | Hung et al. | 371/27 |
| 4,860,217 | 8/1989 | Sasaki et al. | 382/44 X |
| 4,958,302 | 9/1990 | Frederickson et al. | |
| 4,972,359 | 11/1990 | Silver et al. | 382/42 X |
| 4,975,976 | 12/1990 | Kimata et al. | 382/44 |
| 4,985,849 | 1/1991 | Hideaki | 382/44 X |
| 5,081,700 | 1/1992 | Crozier | 395/150 |

*Primary Examiner*—Almis R. Jankus
*Attorney, Agent, or Firm*—Wolf, Greenfield & Sacks

[57] ABSTRACT

A rasterizer which includes a transform analyzer and compiler which generates a transform program for only one scan line of an output image where a given transform specification which defines only orthogonal rotations, and possibly mirroring and scaling. The transform program is interpreted by a transform execution engine, along with the input image data, to produce an output raster image, by repetitively applying the transform program to the input image data for successive scan lines of the output raster image.

20 Claims, 12 Drawing Sheets

01010101

```
     /*   0   1   2   3   4   5   6   7   8   9   a   b   c   d   e   f  */
     /*  --- --- --- --- --- --- --- --- --- --- --- --- --- --- --- --- */
/*0*/{   2, 10,  3, 91,  4, 81, 84,101,  5, 78, 79, 90,  0, 87, 95,108,
/*1*/    6, 20, 21,  0, 80, 82, 83,100,  0,  0, 85, 93,  0, 98,104,110,
/*2*/    7, 16, 17,  0, 22, 33,  0,  0,113, 27, 34, 89,  0, 86, 94,107,
/*3*/    0,  0,  0,  0,  0, 88, 92, 99,  0,  0,  0, 96,  0,102,105,111,
/*4*/    8, 13, 14,  0, 18,  0,  0,  0, 23, 28, 29,  0,  0,  0,  0,  0,
/*5*/  114,  0, 30,  0, 35, 40, 41,  0,117,  0, 42, 53,  0, 97,103,109,
/*6*/  119,  0,  0,  0,  0,  0,  0,  0,118,  0, 43, 49,126, 50, 54,106,
/*7*/  129,  0,  0,  0,128,  0, 55, 62,137,  0,136, 63,142, 67, 71, 76,
/*8*/    9, 11, 12,  0, 15,  0,  0,  0, 19, 25,  0,  0,  0,  0,  0,  0,
/*9*/  112, 24, 26,  0, 31, 38,  0,  0,  0,  0,  0,  0,  0,  0,  0,  0,
/*a*/  115,  0,  0,  0, 32, 36,  0,  0,116, 37, 39, 47,120, 44,  0,  0,
/*b*/  122,  0,  0,  0,121, 45, 51, 60,131,  0,130, 56,138, 64, 68, 74,
/*c*/  125,  0,  0,  0,  0,  0,  0,  0,  0,  0,  0,  0,  0,  0,  0,  0,
/*d*/  124,  0,  0,  0,123, 46, 48,  0,127,  0, 52, 57,132, 58, 65, 72,
/*e*/  135,  0,  0,  0,  0,  0,  0,  0,134,  0,  0,  0,133, 59, 61, 69,
/*f*/  141,  0,  0,  0,140,  0,139, 66,144,  0,143, 70,145, 73, 75, 77};
```
⎫
⎬ 112
⎭

```
      /*    0    1    2    3    4    5    6    7    8    9  */
      /*  ---- ---- ---- ---- ---- ---- ---- ---- ---- ---- */
/*  0*/{0x00,0x00,0x00,0x02,0x04,0x08,0x10,0x20,0x40,0x80,
/*  1*/ 0x01,0x81,0x82,0x41,0x42,0x84,0x21,0x22,0x44,0x88,
/*  2*/ 0x11,0x12,0x24,0x48,0x91,0x89,0x92,0x29,0x49,0x4a,
/*  3*/ 0x52,0x94,0xa4,0x25,0x2a,0x54,0xa5,0xa9,0x95,0xaa,
/*  4*/ 0x55,0x56,0x5a,0x6a,0xad,0xb5,0xd5,0xab,0xd6,0x6b,
/*  5*/ 0x6d,0xb6,0xda,0x5b,0x6e,0x76,0xbb,0xdb,0xdd,0xed,
/*  6*/ 0xb7,0xee,0x77,0x7b,0xbd,0xde,0xf7,0x7d,0xbe,0xef,
/*  7*/ 0xfb,0x7e,0xdf,0xfd,0xbf,0xfe,0x7f,0xff,0x09,0x0a,
/*  8*/ 0x14,0x05,0x15,0x16,0x06,0x1a,0x2d,0x0d,0x35,0x2b,
/*  9*/ 0x0b,0x03,0x36,0x1b,0x2e,0x0e,0x3b,0x5d,0x1d,0x37,
/*10*/ 0x17,0x07,0x3d,0x5e,0x1e,0x3e,0x6f,0x2f,0x0f,0x5f,
/*11*/ 0x1f,0x3f,0x90,0x28,0x50,0xa0,0xa8,0x58,0x68,0x60,
/*12*/ 0xac,0xb4,0xb0,0xd4,0xd0,0xc0,0x6c,0xd8,0x74,0x70,
/*13*/ 0xba,0xb8,0xdc,0xec,0xe8,0xe0,0x7a,0x78,0xbc,0xf6,
/*14*/ 0xf4,0xf0,0x7c,0xfa,0xf8,0xfc,0x00,0x00,0x00,0x02,
/*15*/ 0x04,0x08,0x10,0x20,0x40,0x80,0x01,0x81,0x82,0x41,
/*16*/ 0x42,0x84,0x21,0x22,0x44,0x88,0x11,0x12,0x24,0x48,
/*17*/ 0x91,0x89,0x92,0x29,0x49,0x4a,0x52,0x94,0xa4,0x25,
/*18*/ 0x2a,0x54,0xa5,0xa9,0x95,0xaa,0x55,0x56,0x5a,0x6a,
/*19*/ 0xad,0xb5,0xd5,0xab,0xd6,0x6b,0x6d,0xb6,0xda,0x5b,
/*20*/ 0x6e,0x76,0xbb,0xdb,0xdd,0xed,0xb7,0xee,0x77,0x7b,
/*21*/ 0xbd,0xde,0xf7,0x7d,0xbe,0xef,0xfb,0x7e,0xdf,0xfd,
/*22*/ 0xbf,0xfe,0x7f,0xff};
```
⎫
⎬ 110
⎭

Fig. 13

SYSTEM AND METHOD FOR RASTERIZING IMAGES SUBJECT TO ORTHOGONAL ROTATION

FIELD OF THE INVENTION

The present invention is related to systems for rasterizing images.

BACKGROUND OF THE INVENTION

Rasterizing an image involves sampling input image data according to a transform specification to develop an output raster image. The input image can be obtained from many sources, such as, but not limited to, a scanner, facsimile transmission, video camera, CCD camera, digital camera, or satellite transmission. Such images are often digitized and stored in some form of permanent storage, such as a memory in a computer system. Other images may be generated synthetically by computer graphics generation programs, such as drawing or graphing programs.

A raster image is an image defined by y+1 scan lines, as shown in FIG. 1, each comprised of x+1 pixels. Displaying a raster image involves scanning through each scan line in the raster image in a direction X. When the scanning of a line is completed, the next line in direction Y is displayed in a similar manner.

A raster image is typically broken up into tiles 80 to simplify storage of the image in memory and to minimize disk accesses during processing of the image. A value for each pixel in a tile is stored sequentially according to the order of pixels in the scan line. Successive scan lines in the tile are also stored sequentially in memory. An image may be broken up into as few as one tile and as many as any arbitrary number of tiles supportable by the computer system.

Each pixel in a raster image may have either a binary representation (a 1 or 0) or a value taken from a range of discrete values, such as an 8-bit number (representing the range of integers from 0 to 255). Images whose pixels take on binary values are known as half tone images whereas images having any other representation are known as a continuous tone (contone) images.

A raster image may have one of many possible data representations. Commonly used representations include 1-plane, 3-plane, or 4-plane representations. A 1-plane image is typically a black and white image; a 3-plane image is typically a color image, often represented by red, green and blue (rgb) values; a 4-plane image is typically a color image, wherein pixels are often represented by cyan, magenta, yellow and black (cmyk) values. The term "plane" relates to how the data is grouped together. For example, for a 3-plane rgb image, all red information for all pixels is grouped together, separate from green and blue information. In a 1-plane rgb image all red, green and blue information for a pixel is grouped together. Many other representations are commonly used, and thus the invention is not limited to any specific data representation.

The transform specification indicates the orientation and size of the input image data in the space of the output raster image. A transform may be specified by a function in an interpretable language, such as PostScript. Given a specified transform and parameters of an output raster image, a 3×3 transform matrix may be defined, as shown in FIG. 2. The transform matrix provides an indication of the rotation and scaling of the input image data to be performed as well as its placement in the output raster image.

The transform matrix is used for, among other things, translating a coordinate $(x_i, y_i)$ in the input space to a coordinate $(x_o, y_o)$ in output space. For example, the coordinate (0, 0) is used to construct the three-dimensional vector [0, 0, 1] which is multiplied by the transform matrix to obtain the vector [e, f, 1]. The integer part of (e, f) is the corresponding coordinate $(x_o, y_o)$ in output space, and is the indication of the placement in the output raster image of the pixel in the input image having coordinate (0,0). The other values a, b, c and d of the transform matrix are affected by the desired rotation of the image. In general, $x_o=ax+cy+e$ and $y_o=bx+dy+f$. Because $x_o$ and $y_o$ must be integers, they are truncated if necessary.

It should be understood that a transform matrix is not necessary to rasterization, and thus, to the present invention. Rasterization typically requires an indication of scaling of the input image in the x and y directions, an indication of any rotation and an offset in x and y between a pixel in the output image and the first pixel of the input image (e.g., (0, 0)). In some instances, the information given in a transform specification includes the input image size, the output image size and the position of the input image within the output image.

In general, rasterizing involves determining the appropriate mapping between pixels in the input image data and pixels in scan lines of the output raster image. In conventional rasterizing systems for use on digital computers, there is one generalized transform execution engine 30 (see FIG. 3) which receives as its input a transform specification 32 and input image data 34, to produce an output raster image 36.

Conventional rasterizers assume that each scan line in a raster image is different from any immediately previous scan line, which is true for all but orthogonal rotations. A well-known process using the transform specification allows a rasterizer to determine the mapping between the input image pixels and pixels in each scan line in the output raster image. The general transform execution engine of conventional rasterizing systems determines, using this process, the contents of every scan line even for various simple transforms. For orthogonal rotations and mirroring, computation time and resources are wasted by using this approach.

SUMMARY OF THE INVENTION

The present invention is based on the recognition that, for orthogonal rotations and mirroring of an input image, the mapping between each scan line in an output raster image to a line of pixels in the input image is the same for every scan line in the output raster image. Thus, a function which maps the contents of one scan line with respect to the input image needs to be determined only once. The amount of computation needed to rasterize an image can therefore be significantly reduced. Because the majority of images typically handled by a rasterizer involve only scaling, orthogonal rotations and mirroring, the average time taken to rasterize an image is greatly reduced by the present invention.

A rasterizer in accordance with the present invention involves the use of a transform analyzer and compiler which generates a transform program for only one scan line of the output raster image for transform specifications for which any rotation is orthogonal. The transform program may be a series of codes which are interpreted, or machine instructions which are executed, by an execution engine which accesses the input image data and which repeatedly applies the transform program, once for each scan line of the output image, to produce an output raster image.

BRIEF DESCRIPTION OF THE DRAWING

In the drawing,

FIG. 13 shows two tables illustrating how program bytes are related to program codes;

DETAILED DESCRIPTION

In order that the reader may understand the invention more completely, the following detailed description of an embodiment of the invention will now be provided, which should be read in conjunction with the accompanying drawing.

The present invention has as its basis that, for transform specifications which define a rotation, if any, which is orthogonal, every scan line in the output raster image has the same function describing the mapping of the scan line pixels to some scan line of the input image data however represented. The transform specification may also define mirroring (flips) and scaling without destroying this property. Each pixel in the output raster image either is the same as any previous pixel or is obtained from input image data at a given increment from the pixel immediately previously examined in the input image data.

Figures 4, 5:
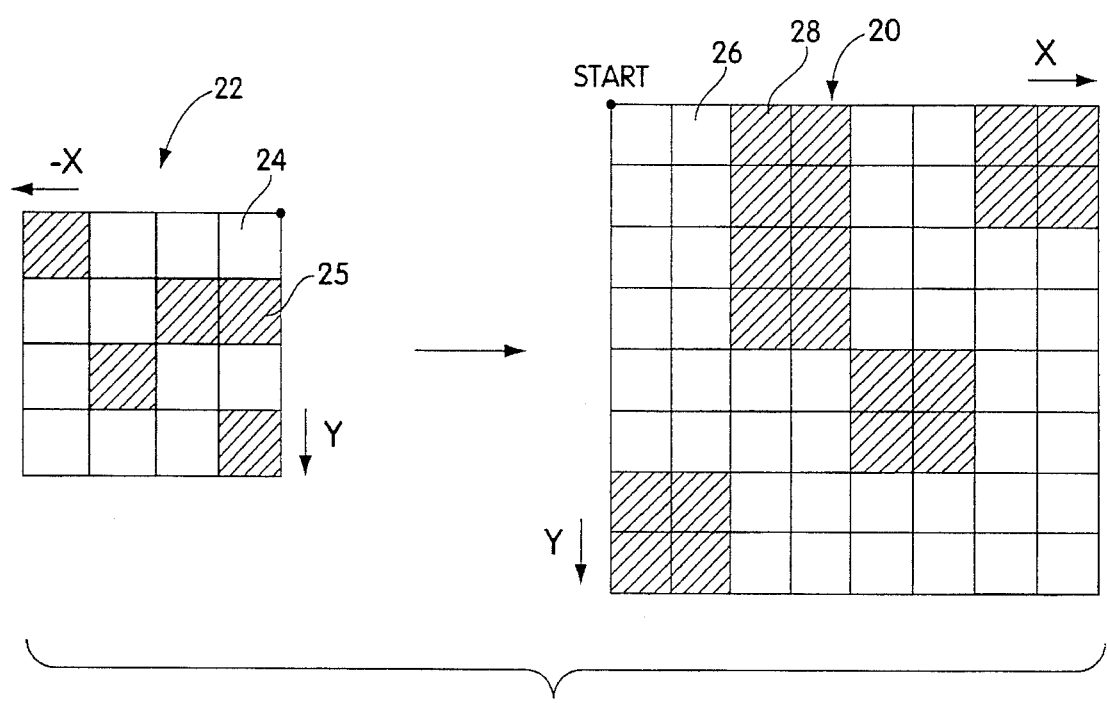
FIG. 4 is a diagram illustrating an example rasterization of an image.
FIG. 5 is a diagram illustrating how the mapping described by a simple transform can be understood.

A simple example of the relationship of an input image to an output raster image data is given in FIG. 4. The output raster image 20 in FIG. 4 is obtained from input image 22 by rotating the input image 270° and by enlarging the input image by a factor of 2. As shown in FIG. 4, the starting pixel (the first pixel in the first scan line (start)) is pixel 24 in the input image data; the second pixel 26 is also the same as pixel 24. The third pixel 28 is obtained from the next pixel 25 in the input image data. Thus, each pixel in a scan line in the output raster image can be represented by a binary value indicating whether it is the same as the current pixel, or obtained from the next pixel, of the input image data.

Another way of explaining this concept is the following. Each output pixel has a corresponding pair of pointers (x and y values) to a pixel of the input image. The integer part of these pointers represents the input pixel to be used for the output pixel. Each output pixel for which the integer part of one of its pointers to the input image is different from the integer part of the next output pixel is represented by a "1," or other non-zero value. If the integer parts are the same, the output pixel is represented by a "0". A "0" representation for an output pixel merely represents that the input image pixel for that output pixel is the same as the next output pixel in the scan line. A "1" represents that the next output pixel in the scan line is different. Each pixel in an output scan line can then be represented by one bit, the value of which represents the function to be performed to obtain an appropriate pixel from the input image data. Because rotation is orthogonal, all of the scan lines have this same relationship to the input image data. FIG. 5 illustrates a representation of eight pixels of the first scan line of the image shown in FIG. 4 in accordance with this concept.

The representation of a scan line, such as in FIG. 5, is generated in the following manner. Assume that the X and Y pointers to the input image (pixel 24, FIG. 4) for the first output pixel (start) are 8 and 0. Increment values for these pointers ($\Delta x$ and $\Delta y$) corresponding to the given scaling factor and rotation of the input image are defined by the transform specification (in this example, $\Delta y=0.5$ and $\Delta x=0$, corresponding to the scaling factor of 2 and 270° rotation). The X and Y pointers to the pixel in the input image for the next output pixel 26 are determined (and are 8, 0.5). Because the integer part of the X and Y pointers for the start pixel and for pixel 26 are the same, the value "0" is used to represent the start pixel of the output image. Repeating this process again for pixel 26 in the output image, and examining the pointers for pixel 28, the integer part of the Y pointer to the input pixel for output pixel 28 increments, becoming 1. Thus, the value "1" is used to represent output pixel 26.

When generating the output raster image from this representation, integer x and y pointers to the input image are used. Starting with the coordinates for the first pixel in the input image as the current pointers for the first pixel for the output scan line, every "0" encountered in the representation indicates that the input image pixel corresponding to the current pointers is stored for the current output pixel. Every "1" in the representation indicates the same storing function, but that one of the current pointers is to be incremented afterwards. Where the input image data is enlarged, the increment for the current pointers to the input image data is always one and is only in one direction (x or y). The increment for the other direction is zero. In the example FIG. 4, the y coordinate is incremented. When the input image is reduced in size, the increment to the pointer to the input image data may not always be one. For example, when scaling an input image by a factor from the range from 0.5 to 1.0 the increment may be 1 or 2. Thus each pixel in the output scan line would be represented by two bits.

Figure 6:
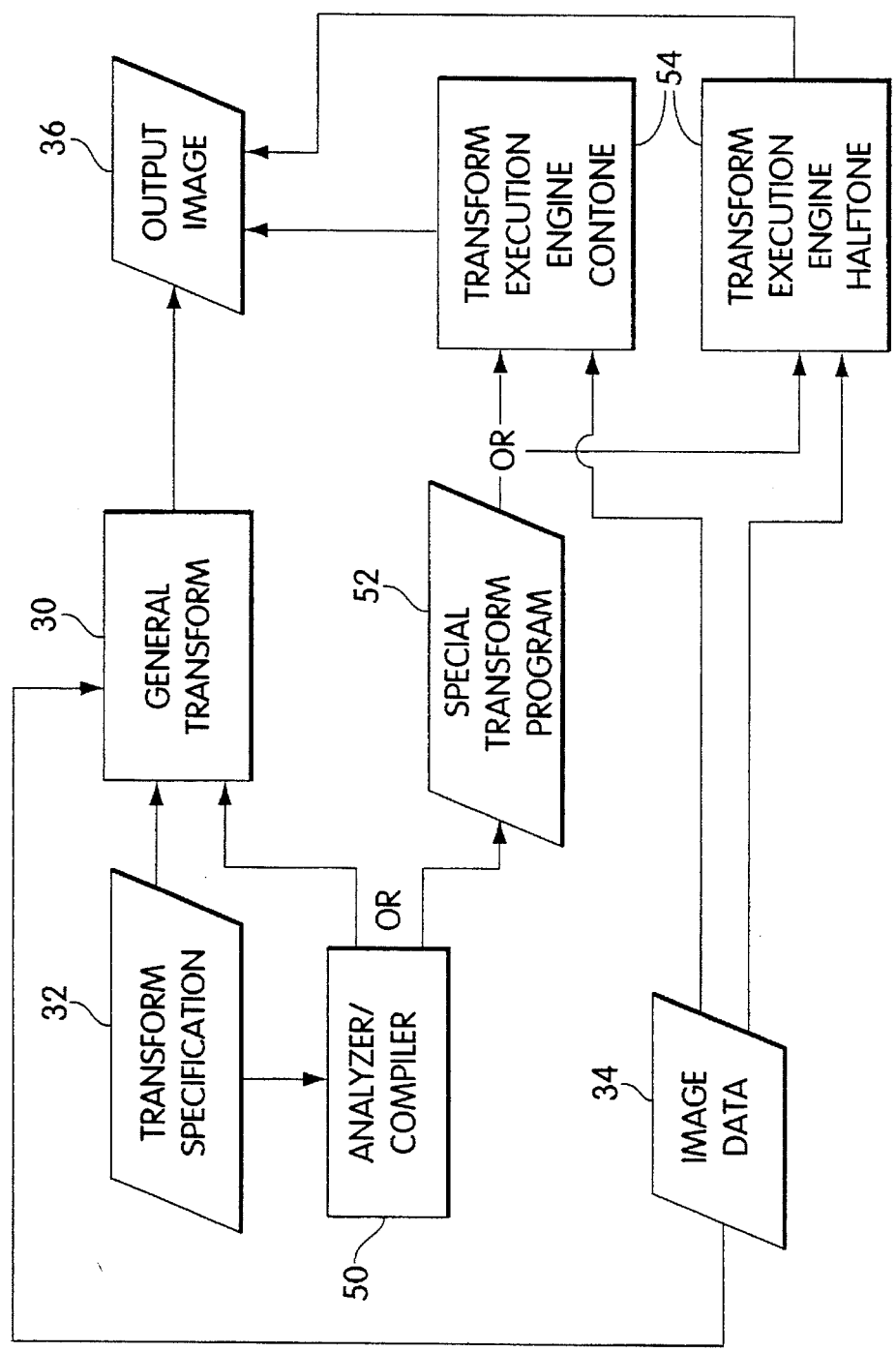
FIG. 6 is a block diagram of a rasterizing system in accordance with the present invention.

For simple rotations (i.e., multiples of 90°) and mirroring, a function describing the mapping of input image data to an output scan line needs to be determined only once. In accordance with the present invention (see FIG. 6) an analyzer and compiler 50 is used to determine, among other things, whether the general transform 30 needs to be used. If the transform specification 32 indicates a simple rotation or mirroring, the analyzer and compiler 50 generates a special transform program 52, which is a series of values such as described above in connection with the description of FIGS. 4 and 5, for the first scan line of the output raster image. Such a special transform program can be interpreted by a special transform execution engine 54, using the input image data 34, to produce the desired output raster image 36. The transform execution engine 54 is simply responsive to the special transform program to generate the desired values for each pixel of each scan line in the output image data.

The transform execution engine 54 can also be divided into two parts, one for handling continuous tone images and the other for handling half tone images, because the data representations for half tone images are often different from those for continuous tone images.

Figure 7:
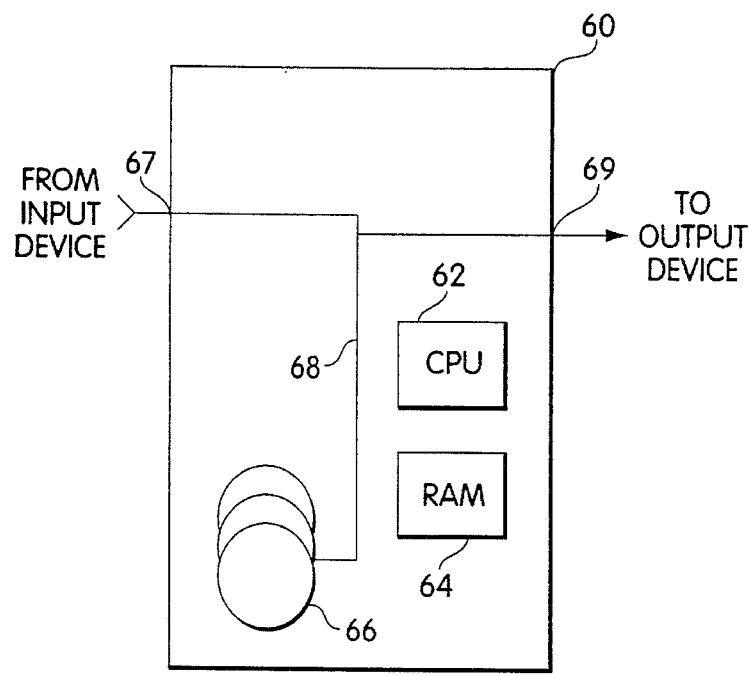
FIG. 7 is a block diagram of a typical computer system with which the present invention can be implemented.

This rasterizing system can be implemented using a digital computer 60 (see FIG. 7) which includes a central processing unit 62, and a random access memory 64. A nonvolatile memory, such as either a hard disk or a floppy disk 66, may optionally be provided to store large images. The CPU, random access memory, and nonvolatile memory are interconnected via a bus 68 which also connects the computer to input and output devices via interfaces 67 and 69.

There are many digital computers which are suitable for implementing the present invention. The invention is not limited to those described in this application. Examples of such suitable systems are the following.

A first system has as its central processing unit an INTEL 386 or 486 processor which is operated using disk operating system (DOS) version 3.2 or better. The system embodying the present invention may be implemented using MetaWare High-C, version 1.7 or better and using the PHARLAP DOS/Extender version 4.0 or 2.2D.

Another configuration includes a central processing unit comprising an INTEL 286 or 386 processor which is operated using DOS version 3.2 or better, Microsoft Windows version 3.0 or 3.1. A system embodying the invention may be implemented using Microsoft C, version 5.1.

Other configurations, using the UNIX operating system, include implementations using a SPARC station, manufactured by Sun Microsystems, Inc. and using OS tools version 4.1.1. Another suitable system uses a Silicon Graphics Indigo, Iris or 4D50. The Santa Cruz Operation (SCO) version of Unix may also be used as an operating system for a system using an INTEL 386 processor for example.

These and other computer systems can be programmed using common techniques so as to implement the functions which will be described below. The invention is not limited by the computer and programming languages described as those skilled in the art will readily recognize. For example, the versions of the systems described above can clearly be better than those listed.

The operation of a system in accordance with the present invention will now be described in more detail in connection with FIGS. 8–15.

Figure 8:
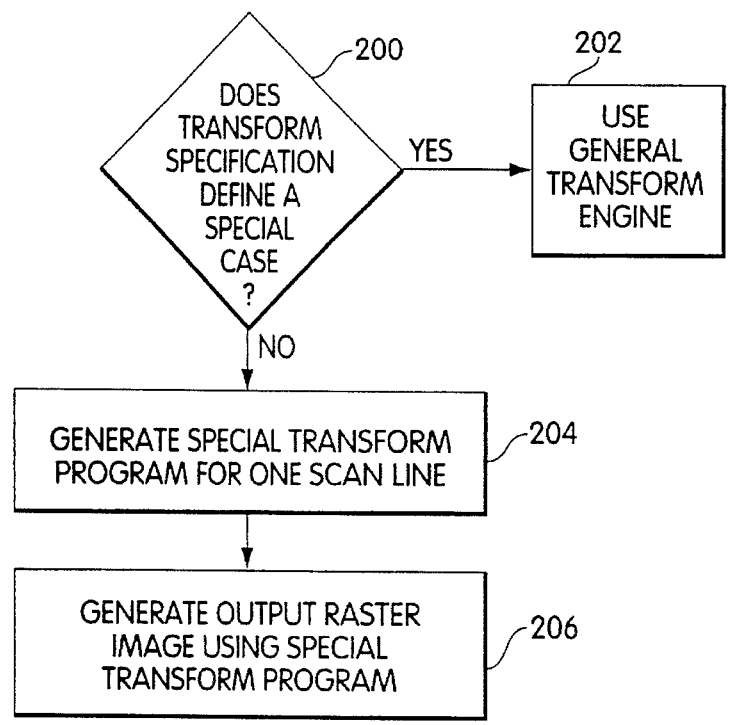
FIG. 8 is a flow chart describing the general operation of a system in accordance with the invention.

Referring now to FIG. 8, the analyzer and compiler 50 first determines whether the transform specification defines an orthogonal rotation or mirroring (step 200). In an embodiment where the transform specification is defined by a transform matrix, the analyzer and compiler 50 determines whether the matrix defines non-orthogonal rotation and whether it defines some other special case which would be handled better by the general transform engine 30. The determination of whether special cases are defined by the transform matrix is described in more detail below in connection FIG. 9.

If the transform matrix defines a special case, the general transform engine 30 (FIG. 6) is invoked to generate the output raster image according to that transform (step 202). Otherwise, the analyzer and compiler 50 generates a special transform program for the output image (step 204). The generation of a special transform program will be described in more detail below in connection with FIG. 10.

Given a special transform program, the transform execution engine 54 generates the output raster image (step 206) in accordance with a process such as will be described in more detail below in connection with FIGS. 14 and 15.

Figure 9:
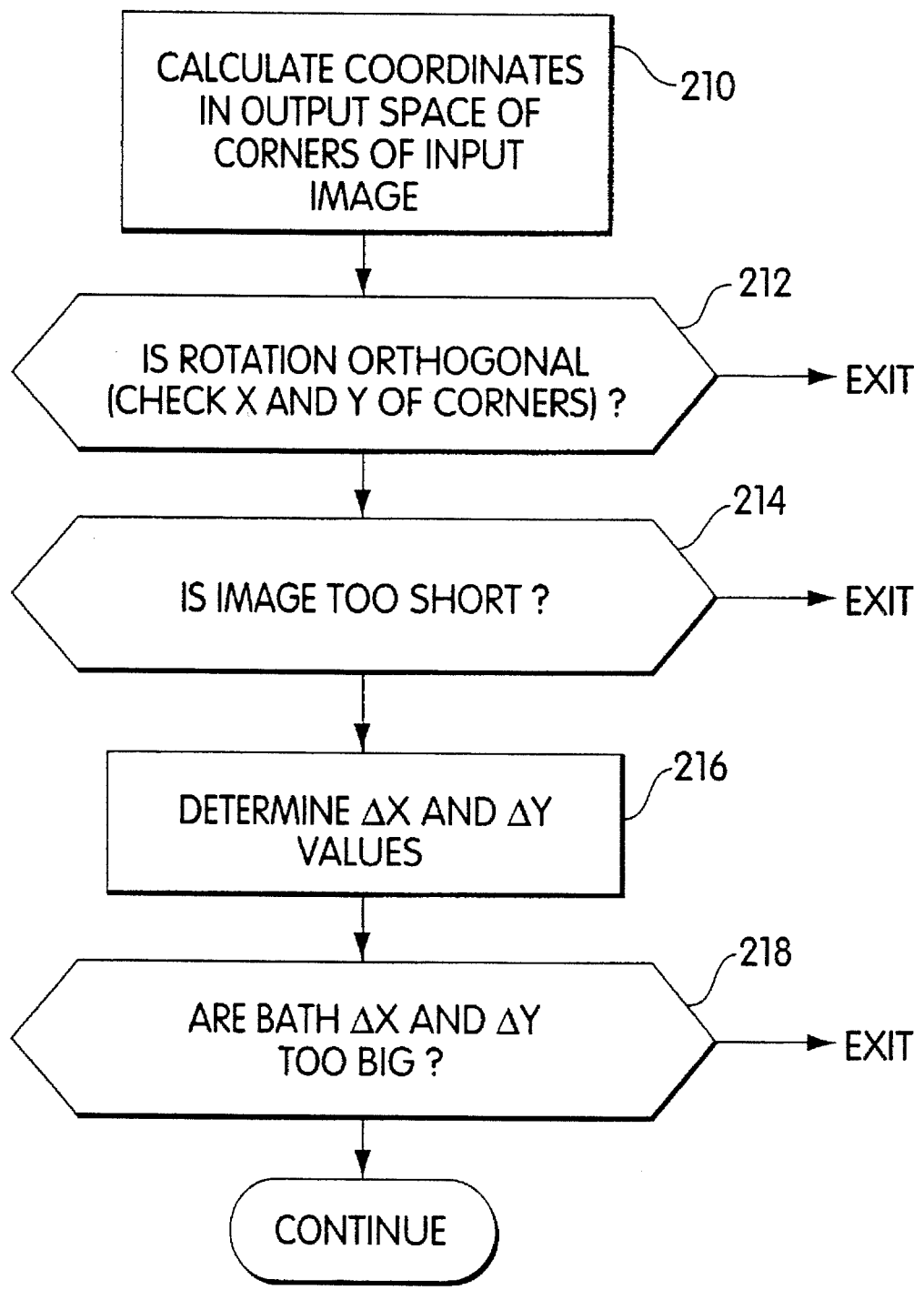
FIG. 9 is a flow chart describing how special cases are determined and rejected by the transform analyzer and compiler.

The determination of whether special cases are defined by the transform matrix will now be described in more detail in connection with FIG. 9. The first step 210 of this process is determining the coordinates in the output image space of the corners of the input image. With a transform matrix as in FIG. 2, and an input image with a known size in the x-direction (x_size) and in the y-direction (y_size) this process involves transforming each of the following coordinates into the output space: (0, 0), (0, y_size−1), (x_size−1, 0), (x_size−1, y_size−1). As described above, (0, 0), for example, translates to (e, f) in the output image. The input pixel having the minimum coordinates in both x and y in the output space is considered to be the top, left coordinate in the output image, and is the start pixel for generating the special transform program.

From this information, it can be determined if the transform matrix defines a non-orthogonal rotation (step 212). For example, if the Y coordinates in the output space of the top corners (in the output space) of the input image are different the transform indicates a non-orthogonal rotation and should be handled by the general transform engine.

If the X coordinates in the output space of the start pixel and of the pixel of the bottom left corner (in the output space) of the input image are different the transform indicates a non-orthogonal rotation and should be handled by the general transform engine.

Figures 1, 2:
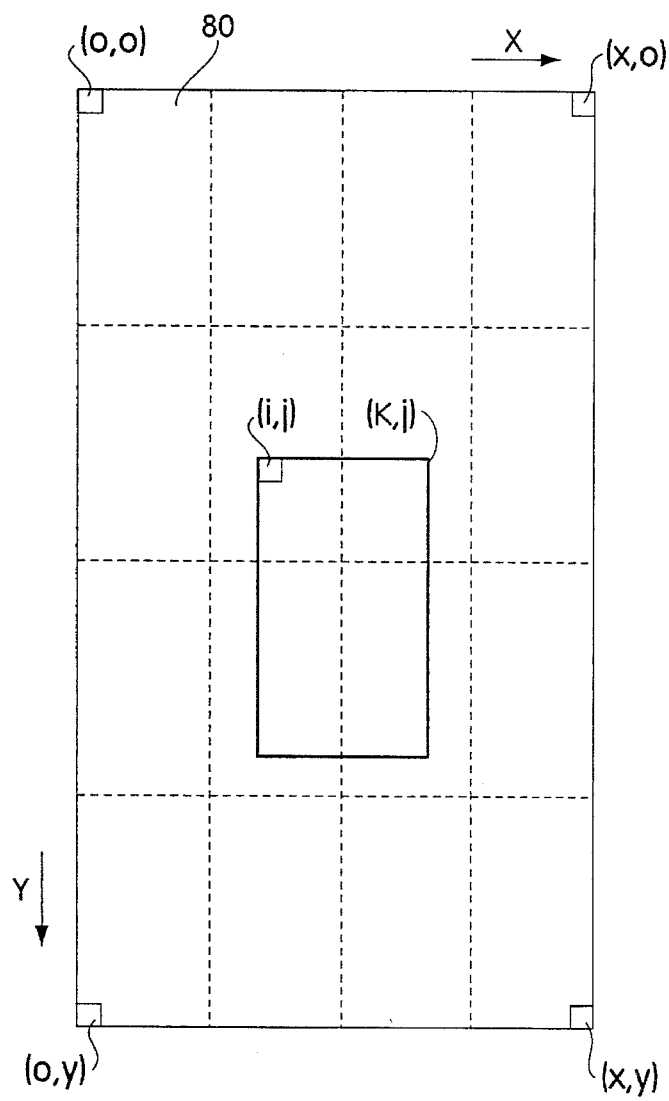
FIG. 1 is a diagram of a data structure for a tiled raster image for which an input image will be rasterized.
FIG. 2 is a schematic illustration of a data structure for a transform matrix.
Figure 3:
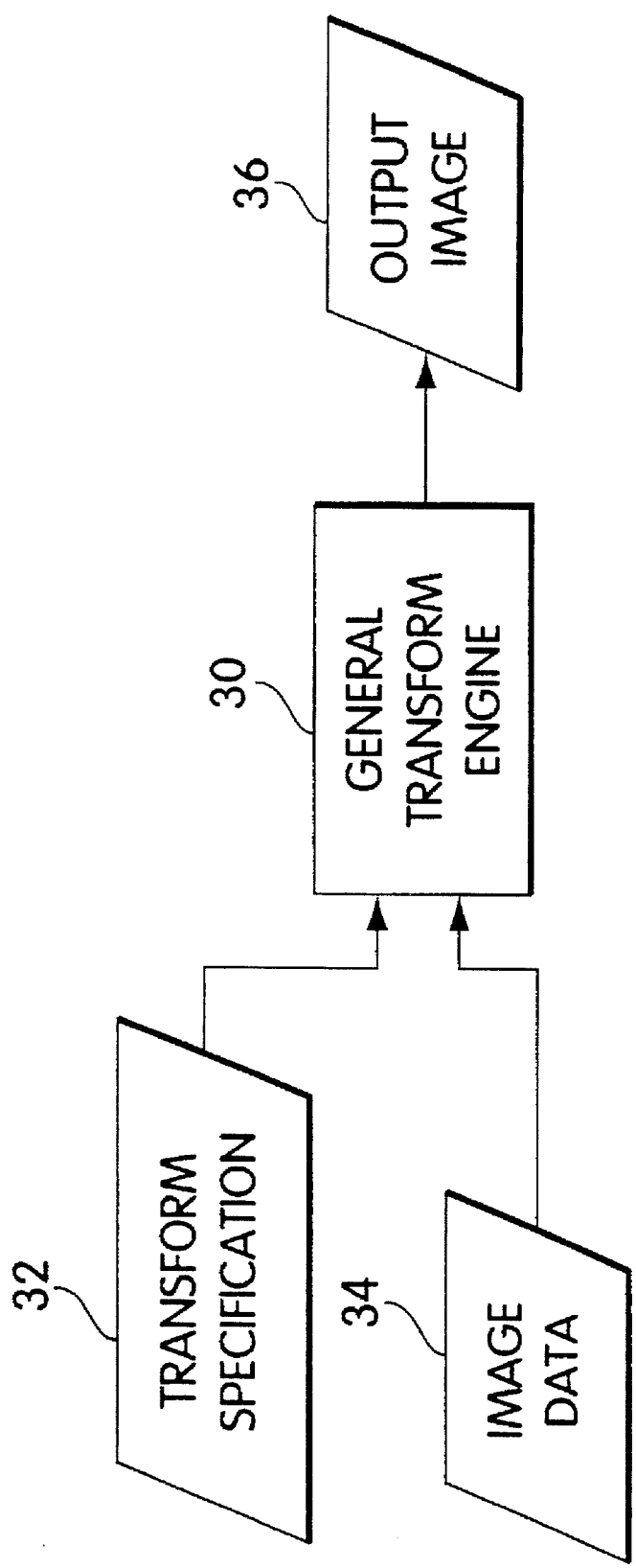
FIG. 3 is a block diagram of a conventional image rasterizer.

Given a transform matrix of the form shown in FIG. 2, the conditions tested in step 212 can be expressed by requiring one of the following two alternate pairs of equalities to be true:

Either:

(1) int(e)=int(c(y_size−1)+e) and int(f)=int(b(x_size−1)+f)

or (2) int(e)=int(a(x_size−1)+e) and int(f)=int(d(y_size−1)+f).

In this embodiment, if the output image is too short (having only a few pixels in each scan line), as determined in step 214, the transform specification is considered a special case and the general transform execution engine 30 is used.

The increment values for the X and Y pointers ($\Delta x$ and $\Delta y$) in the input image space to be used to generate the special transform program are then determined in step 216, based on the transform specification. For example, if the transform specification indicates a scaling factor of 2 and no rotation, $\Delta x=0.5$ and $\Delta y=0$. Where a transform matrix is used, these values are obtained according to the following equation:

$$[1 \ 0] \cdot \begin{vmatrix} a & b \\ c & d \end{vmatrix}^{-1} = \begin{vmatrix} \Delta x \\ \Delta y \end{vmatrix}$$

With this representation of the transform specification, due to numerical accuracy limitations $\Delta x$ and $\Delta y$ may both be non-zero even if the rotation is orthogonal; however one of these values should be very small. Therefore, if the absolute values of both the X increment and Y increment values ($\Delta x$ and $\Delta y$) are greater than some small value, for example 0.01, as determined in step 218, the transform specification indicates a non-orthogonal rotation and is therefore a special case to be handled by the general transform engine 30.

There are many other conditions that could be tested in addition to or in place of the tests described above in connection with FIG. 9. The invention is not limited to the specific tests shown. The inventors have used these tests to obtain suitable results in one embodiment of the invention. In some embodiments it may be possible that the transform specification cannot describe anything but orthogonal, if any, rotation. In these embodiments, no tests are necessary.

Figure 10:
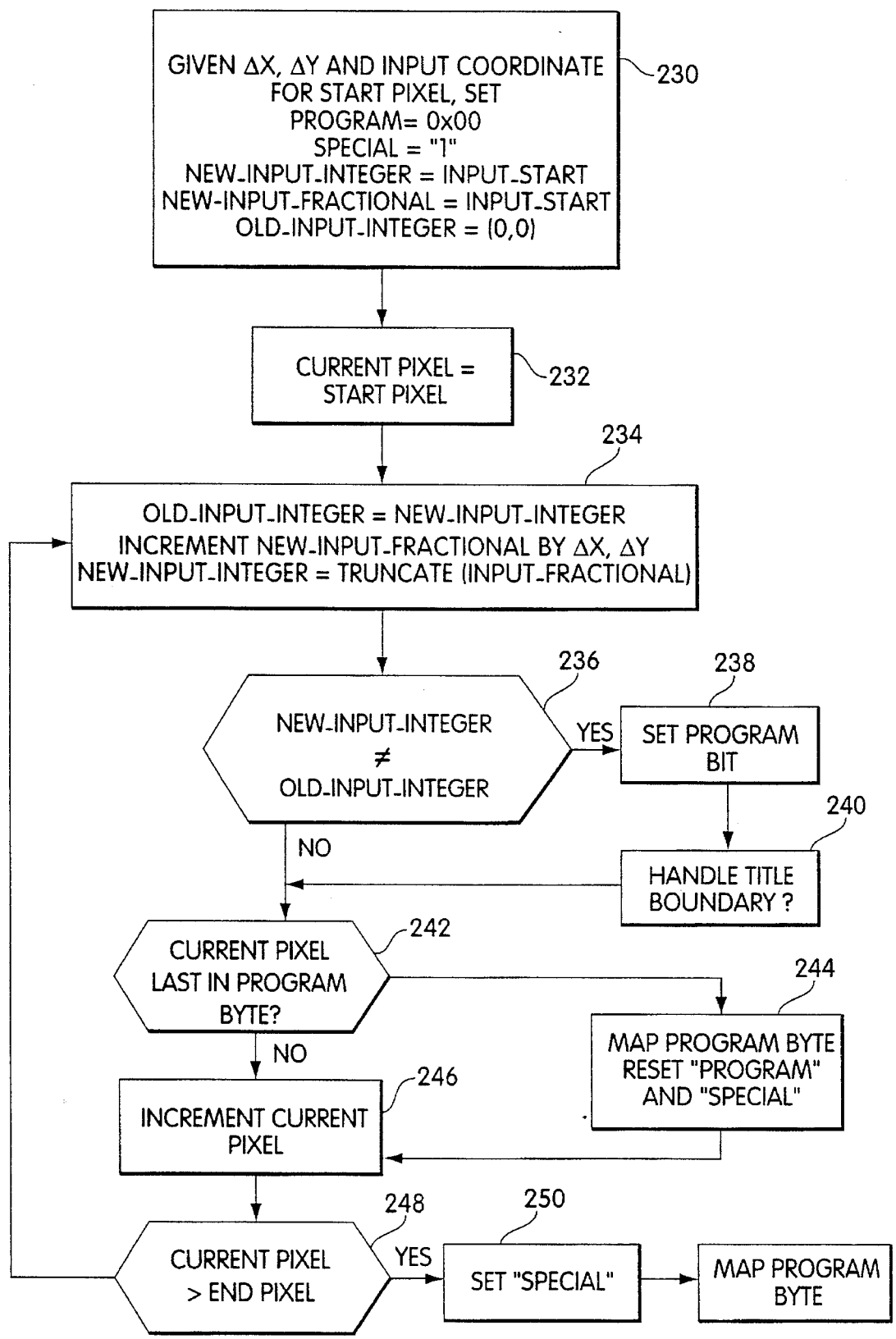
FIG. 10 is a flow chart describing in more detail how a special transform program is generated.
Figure 11:
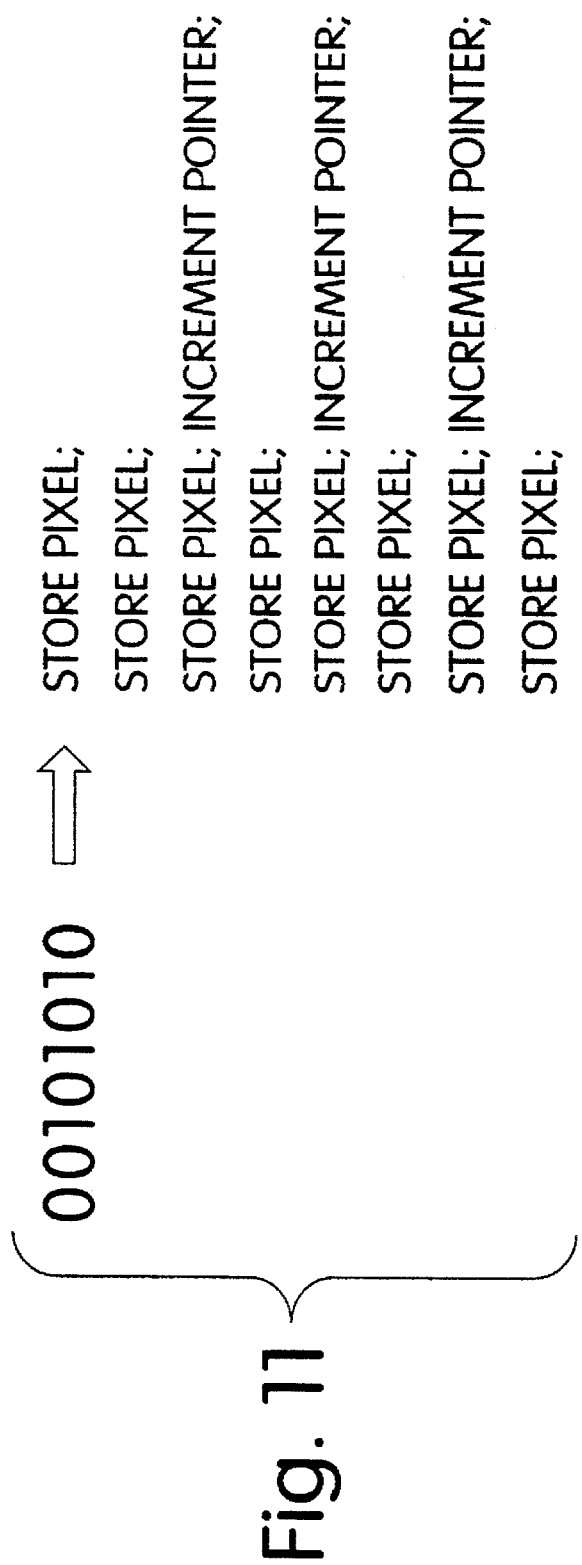
FIG. 11 is an example of how a program byte of a special transform program may be interpreted by a transform execution engine.

The process of generating the special transform program for a scan line of an output image will now be described in more detail in connection with FIG. 10. For this purpose, the output scan line is divided into a sequence of groups of pixels, each group preferably being a byte. The following description assumes a byte is used; other groupings are also possible. The start and end bytes, representing the bytes of the output raster image scan line which include the pixels corresponding to the top (in the output space, as determined above) corners of the input image, are determined in step 230. For example, in the example of FIG. 1, assuming that each tile 80 is only one byte wide, the start pixel (i,j) in the output scan line is in byte 1, where the end pixel (k,j) is in byte 2 of the scan line. The start pixel for the purpose of generating a special transform program is the x coordinate of the start pixel (i,j). Similarly, the x coordinate of the end pixel (k,j) is considered the end pixel.

A number of other variables are also initialized as noted in step 230. Some of these values were previously calculated as described above, namely $\Delta x$, $\Delta y$, and the coordinates of the input pixel corresponding to the start pixel of the output scan line. The input pixel coordinates for the start pixel are used to establish the values for "new_input integer" x and y coordinates and "input_fractional" x and y coordinates. Values for "old_input_integer" x and y coordinates are established during the analysis process and can initially be set to zero. Also, for each byte in the output raster image scan line, a variable "program" is defined as a 8-bit number, initially set to all 0's. A flag bit, here called "special" is initially set to one to indicate that the program byte will require special handling to generate the output image. The first byte of the special transform program is always handled specially to generate the output image.

After initialization, a program loop is entered which performs a series of steps, for each byte between the start byte and the end byte, for each pixel within the byte. The output pixel currently being examined (which is identified by its x coordinate within the scan line) is set to be the start pixel of the scan line in step 232.

In step 234, the "old_input_integer" x and y coordinates are set to be the values currently stored as the "new_input_integer" x and y coordinates. Similarly, the "old_input_fractional" x and y coordinates are set to be the "new_input_fractional" x and y coordinates. A new "new_input_fractional" coordinate is generated by adding the input increment values ($\Delta x$ and $\Delta y$) to the current "new_input frational" values. The integer parts of these values are the corresponding new "new_input_integer" values (step 234).

If the "new_input_integer" coordinates are different from the "old_input_integer" coordinates, as determined in step 236, the program bit corresponding to the current output pixel is then set to "1" in step 238, unless an error occurs, indicating that the pointer to the input pixel for the next output pixel will be one different from the current pointer. An error that may occur is an increment in the integer part of one coordinate (e.g., x) when an increment is only expected in the integer part of the other coordinate (e.g., y). If such an error occurs, it typically indicates that the transform specification defines a slightly non-orthogonal rotation which should be handled by the general transform execution engine.

Special cases, such as if the system includes tiled input images and a tile boundary is crossed, are then handled in step 240. If such a special case occurs, the "special" flag bit is set.

After the program bit for the current pixel is set, or if the "old_input_integer" and "new_input integer" coordinates are the same, it is then determined in step 242 if the current output pixel is the last one in the given program byte. If it is, the program byte and the "special" flag bit are mapped to a special transform program code using the table 110 of FIG. 14 (to be described below). The code is then stored (step 244). The variable "program" is then reset to all 0's, and the "special" flag bit is reset to "0", to be used for the next byte of the output scan line.

The current output pixel value (the x coordinate in the scan line) is then incremented in step 246. If the current pixel coordinate is greater than the end pixel coordinate, the scan line has been processed. The last program byte is indicated as a special case to be handled during output generation by setting the "special" flag bit (step 250). The last program byte is then mapped along with the "special" flag bit to a program code which is then stored. Otherwise, steps 234 through 248 are repeated for the new current input pixel.

As described above, the series of binary values describing the first scan line of the output raster image with respect to the input image data is divided into bytes (8 binary values) or other suitable subdivision. Because each bit in a subdivision represents an instruction, each subdivision (combination of bits) represents an instruction. When an instruction is represented as a byte, there are only 256 possible instructions, each of which include 8 sequential instructions which are selected from a set of two possible instructions. The two possible instructions are (1) store, as the current pixel in the output raster image, the input image data corresponding to the current X and Y pointers and (2) the same instruction then increment the X and Y pointers. Therefore, only two instructions need to be provided as data-representation-dependent instructions: one for storing, another for incrementing. When these data-representation-dependent instructions are developed, a program for the transform execution engine which interprets a special transform program can be automatically generated for a given data representation.

To generate the interpreter part of the transform execution engine, data-representation-independent representations of the two functions are provided. These representations, for example, could be "store pixel" and "increment pointer". Then, for each possible special transform program byte a list of instructions is generated, for example, where each "0" in the special transform program is translated into "store pixel", and each "1" is translated into "store pixel" and "increment pointer". See FIG. 11 for an example. By generating an instruction list such as the one shown in FIG. 11 for each possible special transform code, a program for the transform execution engine is generated.

Data-representation-dependent definitions for "store pixel" and "increment pointer" are provided to generate transform execution engines for different image data representations. Such definitions for the functions "O" and "I" to process an implementation for half tone images, may be the following:

```
/* O(o,b) stores one output pixel. In the half tone
case, a given pixel value is compared to a given
threshold for that pixel. If the comparison
indicates, the corresponding output bit is set: */
#define O(o,b) if (threshold_scan_ptr[o] > pixel)
    patt l = b;
/* I increments the pointer for the next input pixel */
#define I x_ptr += IS.img_tile_ptr_step; pixel = *x
ptr;
/* S indicates how many input pixels have been taken */
#define S(x) count -= (x);
where "x_ptr" is the pointer to the input image data
and "pixel" is the value of the input pixel. "o"
``` represents the output pixel number (from 0 to 7) within the eight currently being processed. "b" represents a bit mask, indicating the bit in a byte in the output image to which the currently processed bit corresponds. "b" may be the same value as "o" or may be 7–"o", depending on the data representation.

For an implementation of continuous tone images, I and S(x) may have the same definition. For unclipped continuous tone images, O(o,b) may be defined as the following:

```
#define O(o,b) sptr[o]=pixel;
```

To handle clipped continuous tone images, O(o,b) may be defined as the following:

```
#define O(o,b) if (clip_ptr[o] != 0)
                   sptr[o] = pixel;
```

The meanings of these functions will be more clearly understood in connection with the description of the transform execution engine, whose operation is described below in connection with FIGS. 14 and 15.

A program for the transform execution engine can then be compiled for use on a target machine, using the data-representation-dependent implementations (or definitions of) the functions "store pixel" and "increment pointer", to generate a machine-dependent object code for a transform execution engine.

It is possible to reduce the number of program bytes which the transform execution engine must handle from those which are mathematically possible (256 where each program byte is eight bits) because the number of sequences bits which are actually physically possible, i.e. those which would actually occur in a rasterizer, is not 256. For example, the pattern "1110011" cannot occur. This reduction will now be described in connection with FIGS. 12 and 13.

Figure 12:
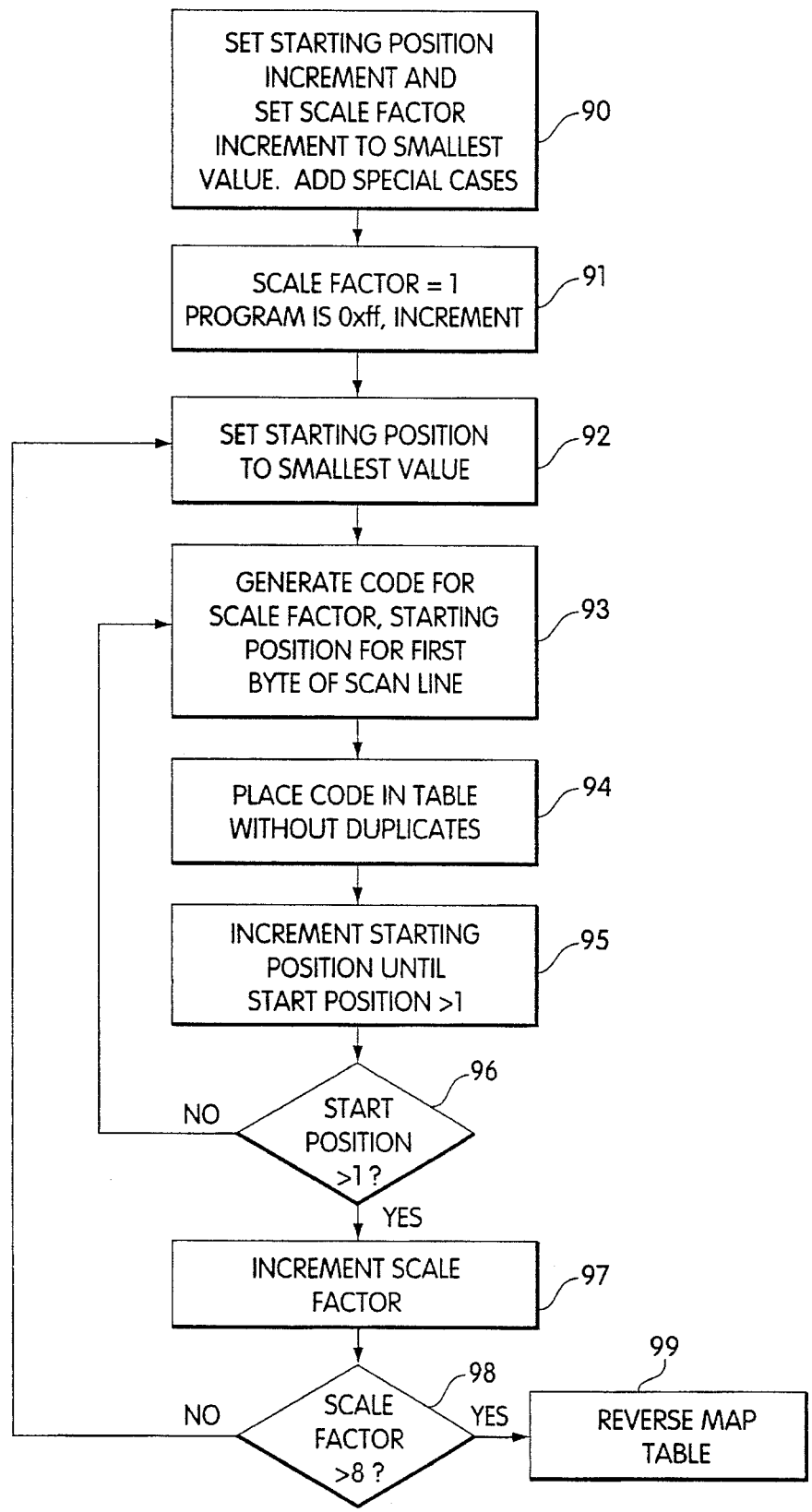
FIG. 12 is a flow chart describing how all possible special transform program codes can be determined.

FIG. 12 is a flow chart describing how all the actually possible program bytes may be determined, i.e. by generating an exhaustive list of all the possible program bytes which may result from any transform specification. In one way to generate this list, the resolution of the fractional part of a starting point (within an output image pixel) and the resolution of the fractional part of the scale factor are selected and a loop of steps is performed on a range of scale factors from the smallest, which in this example is 1, to the number of bits per instruction, i.e., in this example, 8.

The first step of this process, in FIG. 13, is the step of selecting a scale factor increment and a starting position increment (step 90). For example, if the fractional parts of the scale factors and starting positions are 16-bit fixed point decimal numbers, these increments are $1/_{32}K$ (i.e., $\frac{1}{2}^{15}$). A scale factor is then set to 1, or any other lowest acceptable scale factor for any given implementation, in step 91. All of the program bytes that could occur for that scale factor are generated in steps 92–96 and stored in the table without duplicates.

All of the possible program bytes for all scale factors were generated in the following manner. The starting position within a pixel of the input image is set in step 92 to the lowest possible value (i.e., 0). The mapping for a byte given the current scale factor and starting position is then generated in step 93 for the first byte of a scan line. (Such a mapping is generated according to steps 234 through 248 of FIG. 10 where the initial "new_input_fractional" coordinates are the given starting position and 0 and the Δx value is determined by the scale factor). The generated program byte is then placed in a table, without any duplicates, in step 94. The starting position is then incremented in step 95 by the starting position increment value which was previously selected. If the resulting starting position is not greater than 1, as determined in step 96, steps 93 through 96 are repeated. When all of the possible start positions between 0 and 1 have been considered, the scale factor is incremented by the previously selected scale factor increment in step 97. If the resulting scale factor is not greater than 8, as determined in step 98, steps 92–98 are repeated using the new scale factor. When the scale factor is greater than 8 as is determined in step 98, special cases are inserted at the end of the table. These special cases correspond to start and end conditions where the first one or more or last one or more bits of a program byte are zero. The first set of program bytes generated in steps 92–98 are then added again into the table. The non-duplicated entries in the table are then reverse-mapped in step 99 as will be described in more detail below in connection with the description of FIG. 13.

FIG. 13 shows two tables generated by the process described in FIG. 12. Table 110 is a table of all possible program bytes which were generated by a program embodying the flowchart of FIG. 12. Note that the first two entries of the table are both "0x00". These first two cases are special cases which will be described in more detail below in connection with the description of the transform execution engine.

This table is then reverse-mapped into a second table 112 which is indexed by an 8-bit number. If an 8-bit number is found in the first table, e.g. 0x02, its index, e.g. 3, in the table 110 is stored in the reverse-mapped table of 112 at the location indexed by 0x02. For any 8-bit number which is not in table 110, the entry in table 112 at the location described by that 8-bit number is "0". By using table 112, the analyzer and compiler 50 generates a code number between 2 to 223 from a program byte and the "special" flag bit by retrieving the number stored in table 112 using the program byte, and adding 146 if the "special" flag bit is set and the number retrieved is less than 78. The transform execution engine uses the code number to access instructions (defined in Appendix A) to generate the output raster image. The table 110 may be used to generate automatically the instructions for the transform execution engine.

The operation of the transform execution engine will now be described in more detail in connection with FIG. 14. The special transform program generated by the analyzer and compiler 50 is a sequence of code numbers, wherein each code number corresponds to a program byte. In this embodiment, each code number is taken from the range from 2 to 223. For those code numbers which represent program bytes which have no special cases to be handled, e.g. 2 to 77, the code number maps directly to a case statement, such as one of the case statements in the program shown in the appendix. Generally speaking, the sequence of instructions in the case statement can then be simply executed to generate the output raster image for that byte of the scan line. Special cases, defined by code numbers 78 to 223 in this embodiment require more steps to handle. The steps executed in a special case include the same steps as if it were not a special case, however, between each operation on a pixel, all of the special cases which could have been detected to set the "special" flag bit are reexamined and any special handling steps are then executed. The steps to be executed are determined using the original 8-bit code for the byte which is retrieved from table 110 using the program code number as the index to the table.

Figure 14:
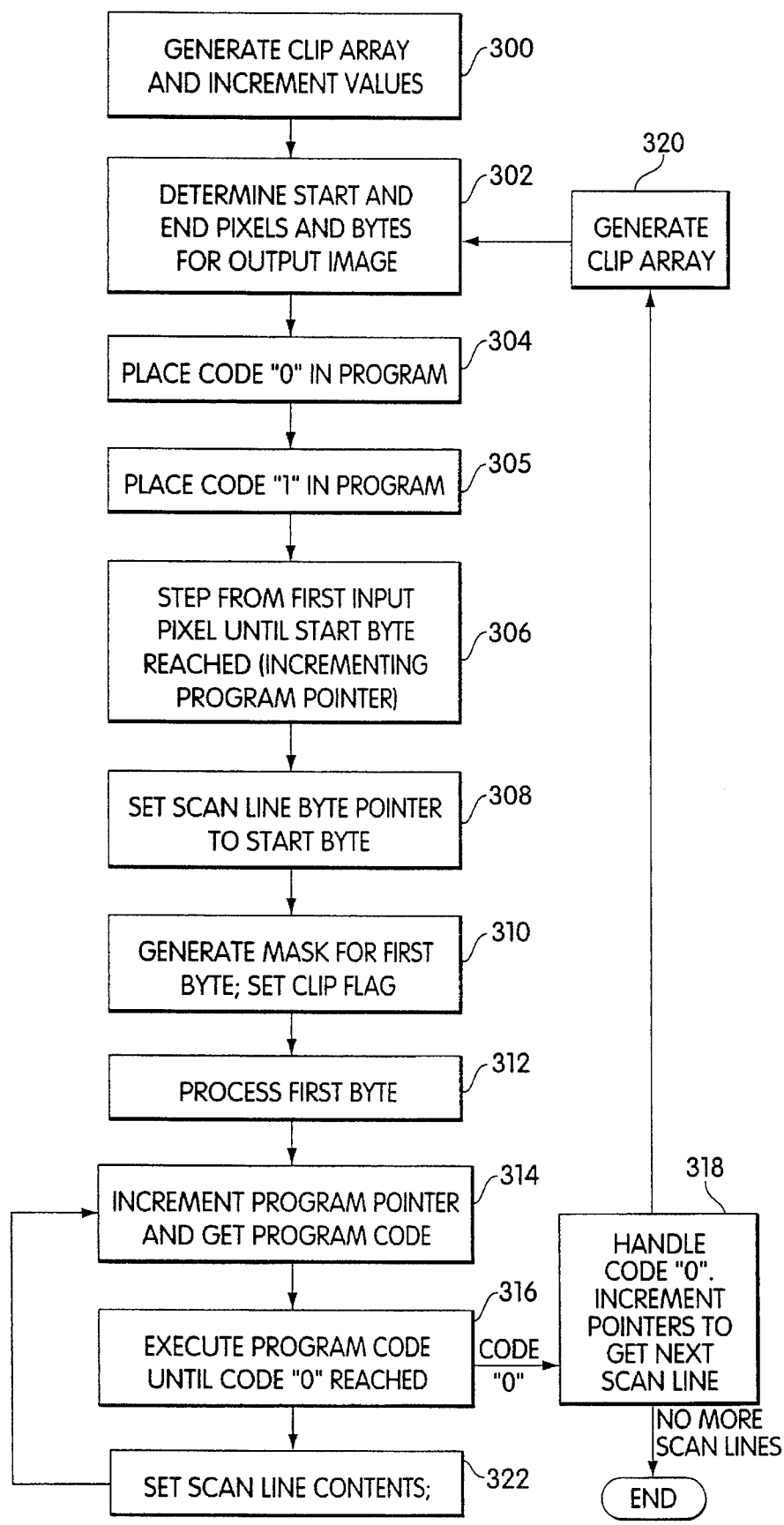
FIG. 14 is a flow chart describing how a special transform program is interpreted by a transform execution engine to produce half tone images.

Referring now to FIG. 14, the details of the operation of the transform execution engine for a half tone image will now be described.

To process a transform program for a half tone image, the transform execution engine processes one byte in the scan line for the output image at time. It uses a pointer to the current program code, a byte of information indicating the current pattern for the byte of the scan line being processed, an indication of any rectangular clipping to be done (such as may be due to the edge of the output image), and an array, matching the scan line, indicating where the image is to be clipped if clipping is not rectangular. An array of values called a threshold array is used to represent thresholds which determine whether a pixel should be on or off for the half tone image. It is preferably divided into groups of bytes whose ends correspond to byte divisions in a scan line.

A clip array for non-rectangular (arbitrary) clips and increment values are determined is step 300. The increment value for the x or y coordinate of a pixel of the input image, which is to be incremented whenever a "1" in a program byte is reached, is 1 or −1. The increment value for the other coordinate is dependent on the scaling factor, and is used to determine the next scan line. The increment value may also be an offset to be applied to a pointer into the data representation of the input image so that a mapping between x and y coordinate and its location in the data representation need not be recalculated for each new pixel.

In step 302, the start and end pixels and bytes in the output image, as determined by any rectangular clipping or by the edges of the input image, are then determined. For the byte in the special transform program which corresponds to the end byte for the output image, a code "0" replaces whatever code is currently in the program. The replaced code is stored for later use (step 304).

In step 305, a code "1" is placed in the transform program where a change in threshold array occurs. The replaced program code is stored, so that it may be restored later.

The transform execution engine steps through the input image pixels until the first input image pixel corresponding to the first pixel of the start byte of the output image is reached, according to the transform program (step 306). When the start byte is reached, that byte of the scan line is selected for processing (step 308). A "mask" is generated for the start byte and a clip flag is set (step 310). The mask is a byte of 0's and 1's which is 0 for pixels in the start byte which are before the start pixel, and 1 otherwise. For example, if the start pixel of the output raster image is the fourth pixel of the first program byte, the mask will be "00001111".

The start byte is then processed by executing the steps indicated by the program byte corresponding to the program code retrieved for the start byte from the transform program (step 312). Because the program byte for the start byte is always generated with a "special" flag bit set by the analyzer and compiler 50, the start byte is always handled as a special case. For each 0 appearing in the mask, no data is stored in the output raster image. However, regardless of whether a 0 occurs in the mask, every increment identified by the program byte of the output pixel coordinates is honored. Using the definitions of O(o,b) and I above, a pattern byte is determined for the start byte. The pattern byte is modified by the mask byte and stored as the currently processed byte of the scan line.

After the start byte is processed, the next scan line byte is selected, the program pointer is incremented to retrieve the next program code in the transform program, and the pattern byte is reset (step 314). The next program code is executed (step 316), by performing the steps identified in the appendix, if the code number is between 2 and 77. If the code is between 78 and 223, the steps indicated by the program byte corresponding to the given code are executed, interleaved with steps for checking for tile boundaries or other special cases. Two exceptional cases, program codes 0 and 1 will now be described.

As described above, code 1 merely indicates that a new threshold array is to be used. When a code 1 is detected by the transform execution engine, the next threshold array is obtained, the code 1 is restored to the original program code, and the next location for a code 1 to be placed in the transform program, if any, is determined. The original program code is then executed in a normal manner.

A code 0 indicates that the last byte for the current scan line of the output image has been reached. The code 0 is restored to its original program code, and the original program code is processed in the same manner as the program code for a start byte is processed. That is, a mask is generated and each step of the corresponding program byte is executed to create the pattern byte. The pattern byte is modified by the mask and stored in the scan line of the output image. After a code 0 is reached, the pointers to the input data for the next scan line are incremented, if necessary (step 318). The clip array (if any) for the next scan line is generated (step 320) and processing continues with step 302 for the next scan line.

Until a code 0 is reached, after a pattern byte is generated for a program code the contents of the currently processed byte of the scan line are set according to the pattern (step 322) and processing continues with step 314.

Figure 15:
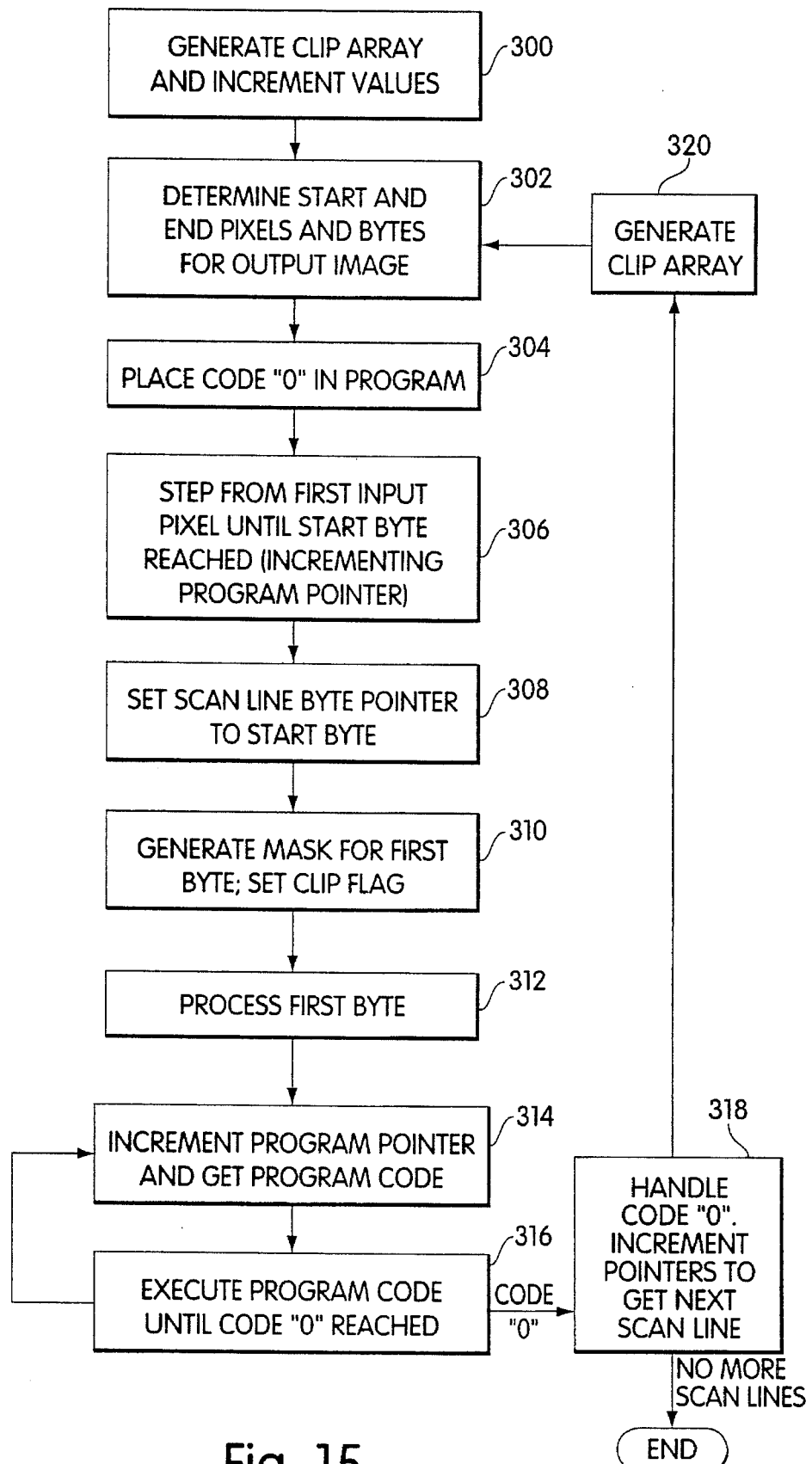
FIG. 15 is a flow chart describing how a special transform program is interpreted by a transform execution engine to produce continuous tone images.

Referring now to FIG. 15, the details of the operation of the transform execution engine for a continuous tone image will now be described.

The processing of continuous tone images by the transform execution engine is essentially the same as the processing of half tone images except for a few minor differences. Because there is no threshold array for continuous tone images, the code "1" program code is not used, and thus, need not be handled. The use of code "0" is essentially the same, along with the processing of each of the code numbers. The program bytes corresponding to code numbers are processed in the same way except that the definitions of the "store pixel" and "increment pointer" functions are different, as described above.

Another difference between continuous tone imaging and half tone imaging is that for continuous tone images, a pattern byte is not made. Each pixel in the output image is processed independently. The difference in processing which therefore occurs is found in the handling of clipped images. As described above in connection with half tone images, a mask byte is generated which modifies a pattern byte which is then stored for a byte in the scan line. For continuous tone images, a mask pixel is generated for each pixel in the scan line to be processed. If clipping is not performed, a mask need not be generated. Therefore, it is advantageous to provide two embodiments of the continuous tone transform execution engine: One for clipped images, another for unclipped images. The definitions above for O(o,b) can be used for these two embodiments. For clipped image, as each pixel in the scan line is processed, the corresponding mask pixel is examined, and any modification of the output pixel is made as indicated.

For both of the transform execution engines, in order to handle special cases of tile boundaries in the input image, the function S(x) described above is used to count the number of input pixels already taken. This count value is used to determine where a tile boundary occurs. There are many other ways which could be used to determine the occurrence of tile boundaries.

A similar process could be used to determine tile boundaries in the output image. A special code, similar to code 0 or code 1, and having similar processing steps could also be used to handle tile boundaries in the output image.

It should be understood that the foregoing description of the invention is intended merely to be illustrative having been presented by way of example only. Numerous other embodiments and modifications may be apparent to those of skill in the art. For example, the analyzer and compiler and the transform execution engine could readily be combined, so that, instead of generating a special transform program, the analyzer and compiler could directly generate machine instructions for generating a scan line of the output raster image. These instructions could then be repeatedly executed to generate all of the scan lines of the output raster image. Similarly, the program codes could be used to access machine instructions stored in a lookup table. Also, techniques of pixel averaging using interpolation, curve fitting and the like, and of error diffusion could also be applied without departure from the spirit of this invention.

These and other such modifications are intended to be within the scope of the present invention as defined by the appended claims.

What is claimed is:

1. A rasterizer, comprising:

an analyzer and compiler which generates a transform program which represents a mapping, in accordance with a rotation and a scaling indicated by a transform specification, for only one scan line of an output raster image, between pixels in an input image to pixels in the output raster image scan line in response to the transform specification indicating the rotation to be orthogonal rotation; and a transform execution engine which receives the transform program and the input image and which generates the output raster image by repetitively applying the transform program to the input image data for successive scan lines of the output raster image.

2. The rasterizer of claim 1, wherein the transform program indicates, for each pixel in the output raster image, whether the pixel is the same as an immediately previous pixel or is obtained from input image data at an increment from the pixel immediately previously examined in the input image data.

3. The rasterizer of claim 1, wherein the transform program comprises a series of binary values, wherein each binary value indicates a pixel in the one scan line of the output raster image and indicates whether the pixel is the same as an immediately previous pixel or is obtained from the next pixel of the input image data.

4. The rasterizer of claim 1 wherein the analyzer and compiler comprises:

first means for determining an first pair of pointers to a first pixel in the input image data for a first pixel in the output raster image;

second means for determining increment values for a pair of pointers according to the scaling factor and rotation to be performed;

third means for determining a second pair of pointers to a second pixel in the input image data for a second pixel in the output raster image according to the first pair of pointers and the increment values;

means for selecting a value to represent the first pixel in the output raster image according to the second pair of pointers for the second pixel in the output raster image; and means for repetitively operating the second and third means for determining and the means for selecting with the second pair of pointers as the first pair of pointers until the transform program is generated for the one scan line.

5. The rasterizer of claim 1, wherein the transform execution engine comprises:

means for determining a first pair of pointers to a first pixel in the input image data for a first pixel in the output raster image;

means for generating an indication of whether a second pixel in the output raster image is the same as the first pixel or is obtained from a second pixel in the input image data by reference to the mapping of the transform program;

means for storing the first pixel in the input image data as the first pixel in the output raster image data;

means for adjusting the first pair of pointers according to the indication provided by the means for generating; and means for repetitively operating the means for generating, storing and adjusting with the second pixel as the first pixel and the adjusted first pair of pointers as the first pair of pointers until the one scan line of the output raster image is generated.

6. A method for rasterizing an input image to obtain an output raster image according to a transform specification which indicates a rotation and a scaling of the input image to be performed to obtain the output raster image, the method comprising the steps of:

generating a transform program which represents a mapping, in accordance with the rotation and the scaling indicated by the transform specification, for only one scan line of the output raster image between pixels in the input image to pixels in the output raster image scan line when the transform specification indicates the rotation to be orthogonal rotation; and generating the output raster image by repetitively applying the generated transform program to the input image for successive scan lines of the output raster image.

7. The method of claim 1, wherein the transform program indicates, for each pixel in the output raster image, whether the pixel is the same as an immediately previous pixel or is obtained from input image data at an increment from the pixel immediately previously examined in the input image data.

8. The method of claim 1, wherein the transform program comprises a series of binary values, wherein each binary value indicates a pixel in the one scan line of the output raster image and indicates whether the pixel is the same as an immediately previous pixel or is obtained from the next pixel of the input image data.

9. The method of claim 1, wherein the step of generating the transform program comprises the steps of:

(a) determining an first pair of pointers to a first pixel in the input image data for a first pixel in the output raster image;

(b) determining increment values for a pair of pointers according to the scaling factor and rotation to be performed;

(c) determining a second pair of pointers to a second pixel in the input image data for a second pixel in the output raster image according to the first pair of pointers and the increment values;

(d) selecting a value to represent the first pixel in the output raster image according to the second pair of pointers for the second pixel in the output raster image; and (e) repeating steps (c), (d) and (e) with the second pair of pointers as the first pair of pointers until the transform program is generated for the one scan line.

10. The method of claim 1, wherein the step of applying the transform program comprises the steps of:

determining a first pair of pointers to a first pixel in the input image data for a first pixel in the output raster image;

identifying whether a second pixel in the output raster image is the same as the first pixel or is obtained from a second pixel in the input image data by reference to the mapping of the transform program; storing the first pixel in the input image data as the first pixel in the output raster image data;

adjusting the first pair of pointers according to the step of identifying; and repeating steps (b), (c), (d) and (e) with the second pixel as the first pixel and the adjusted first pair of pointers as the first pair of pointers until the one scan line of the output raster image is generated.

11. A system for rasterizing an input image to obtain an output raster image according to a transform specification which indicates a rotation and a scaling of the input image to be performed to obtain the output raster image, comprising:

means, operative when the transform specification indicates orthogonal rotation, for generating a transform program which represents a mapping, in accordance with the orthogonal rotation and the scaling indicated by the transform specification, between pixels in the input image to pixels in only one scan line of the output raster image; and means, operative when the transform specification indicates orthogonal rotation and coupled to the means for generating to receive the generated transform program, for repetitively applying the generated transform program to the input image for successive scan lines of the output raster image to generate the output raster image.

12. The system of claim 11, wherein the transform program indicates, for each pixel in the output raster image, whether the pixel is the same as an immediately previous pixel or is obtained from input image data at an increment from the pixel immediately previously examined in the input image data.

13. The system of claim 11, wherein the transform program comprises a series of binary values, wherein each binary value indicates a pixel in the one scan line of the output raster image and indicates whether the pixel is the same as an immediately previous pixel or is obtained from the next pixel of the input image data.

14. The system of claim 11, wherein the means for generating the transform program comprises:

first means for determining an first pair of pointers to a first pixel in the input image data for a first pixel in the output raster image;

second means for determining increment values for a pair of pointers according to the scaling factor and rotation to be performed;

third means for determining a second pair of pointers to a second pixel in the input image data for a second pixel in the output raster image according to the first pair of pointers and the increment values;

means for selecting a value to represent the first pixel in the output raster image according to the second pair of pointers for the second pixel in the output raster image; and means for repetitively operating the second and third means for determining and the means for selecting with the second pair of pointers as the first pair of pointers until the transform program is generated for the one scan line.

15. The system of claim 11, wherein the means for applying the transform program comprises:

means for determining a first pair of pointers to a first pixel in the input image data for a first pixel in the output raster image;

means for generating an indication of whether a second pixel in the output raster image is the same as the first pixel or is obtained from a second pixel in the input image data by reference to the mapping of the transform program;

means for storing the first pixel in the input image data as the first pixel in the output raster image data;

means for adjusting the first pair of pointers according to the indication provided by the means for generating; and means for repetitively operating the means for generating, storing and adjusting with the second pixel as the first pixel and the adjusted first pair of pointers as the first pair of pointers until the one scan line of the output raster image is generated.

16. A rasterizer for converting an input image into an output raster image having a plurality of scan lines according to a transform specification, comprising:

a compiler which generates a transform program which represents a mapping., in accordance with a rotation and a scaling indicated by the transform specification, between pixels in the input image to pixels in only one scan line of the output raster image when the transform specification indicates the rotation to be orthogonal rotation; and a transform execution engine having an input for receiving the transform program and the input image and which generates the output raster image by repetitively applying the transform program to the input image data for each of the plurality of scan lines of the output raster image.

17. The rasterizer of claim 16, wherein the transform program indicates, for each pixel in the output raster image, whether the pixel is the same as an immediately previous pixel or is obtained from input image data at an increment from the pixel immediately previously examined in the input image data.

18. The rasterizer of claim 16, wherein the transform program comprises a series of binary values, wherein each binary value indicates a pixel in the one scan line of the output raster image and indicates whether the pixel is the same as an immediately previous pixel or is obtained from the next pixel of the input image data.

19. The rasterizer of claim 16, wherein the compiler comprises:

first means for determining an first pair of pointers to a first pixel in the input image data for a first pixel in the output raster image;

second means for determining increment values for a pair of pointers according to the scaling factor and rotation to be performed;

third means for determining a second pair of pointers to a second pixel in the input image data for a second pixel in the output raster image according to the first pair of pointers and the increment values;

means for selecting a value to represent the first pixel in the output raster image according to the second pair of pointers for the second pixel in the output raster image; and means for repetitively operating the second and third means for determining and the means for selecting with the second pair of pointers as the first pair of pointers until the transform program is generated for the one scan line.

20. The rasterizer of claim 16, wherein the transform execution engine comprises:

means for determining a first pair of pointers to a first pixel in the input image data for a first pixel in the output raster image;

means for generating an indication of whether a second pixel in the output raster image is the same as the first pixel or is obtained from a second pixel in the input image data by reference to the mapping of the transform program;

means for storing the first pixel in the input image data as the first pixel in the output raster image data;

means for adjusting the first pair of pointers according to the indication provided by the means for generating; and means for repetitively operating the means for generating, storing and adjusting with the second pixel as the first pixel and the adjusted first pair of pointers as the first pair of pointers until the one scan line of the output raster image is generated.

\* \* \* \* \*